(12) United States Patent
Muff

(10) Patent No.: US 11,794,576 B2
(45) Date of Patent: *Oct. 24, 2023

(54) VIBRATION ATTENUATION OF MATING GEARS IN A POWER TAKE-OFF

(71) Applicant: Parker-Hannifin Corporation, Cleveland, OH (US)

(72) Inventor: Derek E. Muff, Memphis, TN (US)

(73) Assignee: Parker-Hannifin Corporation, Cleveland, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 17/498,234

(22) Filed: Oct. 11, 2021

(65) Prior Publication Data

US 2022/0024305 A1 Jan. 27, 2022

Related U.S. Application Data

(63) Continuation of application No. 16/644,008, filed as application No. PCT/US2018/063187 on Nov. 30, 2018, now Pat. No. 11,142,065.

(Continued)

(51) Int. Cl.
*B60K 17/28* (2006.01)
*B60K 25/06* (2006.01)
*B60K 25/02* (2006.01)

(52) U.S. Cl.
CPC .............. *B60K 17/28* (2013.01); *B60K 25/06* (2013.01); *B60K 2025/022* (2013.01); *B60Y 2306/09* (2013.01); *B60Y 2400/424* (2013.01)

(58) Field of Classification Search
CPC ........ B60K 17/28; B60K 25/02; B60K 25/06; B60K 2025/022; B60Y 2306/09; B60Y 2400/424
See application file for complete search history.

(56) References Cited

U.S. PATENT DOCUMENTS 4,488,447 A * 12/1984 Gebhardt ................ F02B 67/04
74/393
5,645,363 A * 7/1997 Dafforn .................. B60K 17/28
403/3

(Continued)

FOREIGN PATENT DOCUMENTS

EP 3636945 A1 4/2020
JP 2002081523 A 3/2002

(Continued)

OTHER PUBLICATIONS

PCT International Search Report and Written Opinion, Application No. PCT/US18/63187, dated Feb. 6, 2019.

(Continued)

*Primary Examiner* — Jason D Shanske
*Assistant Examiner* — James J Triggs
(74) *Attorney, Agent, or Firm* — MacMillan, Sobanski & Todd, LLC

(57) ABSTRACT

A power take-off includes a housing including a mounting surface that is adapted to be secured to a source of rotational energy. The mounting surface has an opening therethrough. An input mechanism includes an input gear that has a portion that extends outwardly from the housing through the opening provided through the mounting surface and is adapted to extend within and be rotatably driven about an input gear rotational axis by a driving gear contained within the source of rotational energy. An output mechanism is disposed within the housing and includes a driven gear that is rotatably driven about an output gear rotational axis by the input gear of the input mechanism. The rotational axis of the input gear and the rotational axis of the driven gear are movable relative to one another so as to minimize the transmission of torque transients and other vibrations therethrough during operation.

3 Claims, 4 Drawing Sheets

Related U.S. Application Data

(60) Provisional application No. 62/592,438, filed on Nov. 30, 2017.

(56) References Cited

U.S. PATENT DOCUMENTS

| | | | | |
|---|---|---|---|---|
| 6,260,682 | B1* | 7/2001 | Rang | B60K 17/28 |
| | | | | 192/70.19 |
| 7,748,288 | B2* | 7/2010 | Chevalier | F16H 57/12 |
| | | | | 74/409 |
| 9,494,227 | B2 | 11/2016 | McPherson et al. | |
| 9,534,663 | B2* | 1/2017 | Hirota | F16H 21/14 |
| 9,765,873 | B2 | 9/2017 | Burrell et al. | |
| 2003/0136212 | A1* | 7/2003 | Allen | F16H 55/18 |
| | | | | 74/460 |
| 2003/0145666 | A1* | 8/2003 | Warner | F16H 57/0006 |
| | | | | 192/223.4 |
| 2009/0180827 | A1* | 7/2009 | Katcher | H02K 5/04 |
| | | | | 403/14 |
| 2015/0276040 | A1* | 10/2015 | Burrell | F16H 57/0006 |
| | | | | 74/398 |
| 2015/0362058 | A1* | 12/2015 | McPherson | B60K 17/28 |
| | | | | 74/11 |
| 2019/0186624 | A1* | 6/2019 | Funk | F16H 57/12 |
| 2020/0408276 | A1 | 12/2020 | Muff et al. | |
| 2021/0018084 | A1* | 1/2021 | Abbott | F16H 57/0006 |
| 2021/0102615 | A1* | 4/2021 | Campbell | F16H 57/12 |

FOREIGN PATENT DOCUMENTS

| | | | | |
|---|---|---|---|---|
| KR | 101649590 B1 * | 8/2016 | | |
| KR | 101649590 B1 | 8/2016 | | |
| WO | 2018081673 A2 | 5/2018 | | |
| WO | WO-2018081673 A2 * | 5/2018 | | B60K 17/28 |

OTHER PUBLICATIONS

The extended European search report, Application No. PCT/US2018/063187, dated Apr. 16, 2021.

* cited by examiner

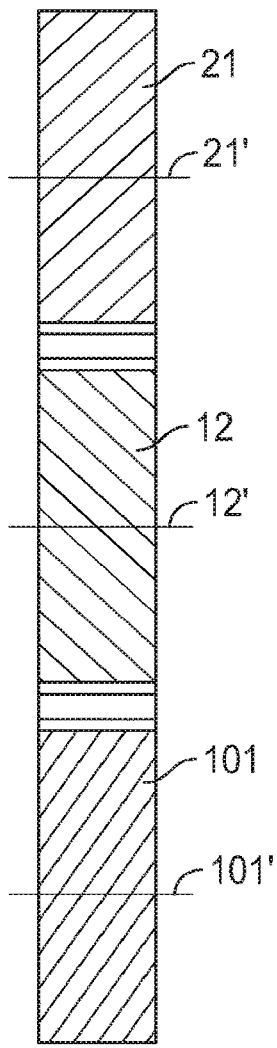 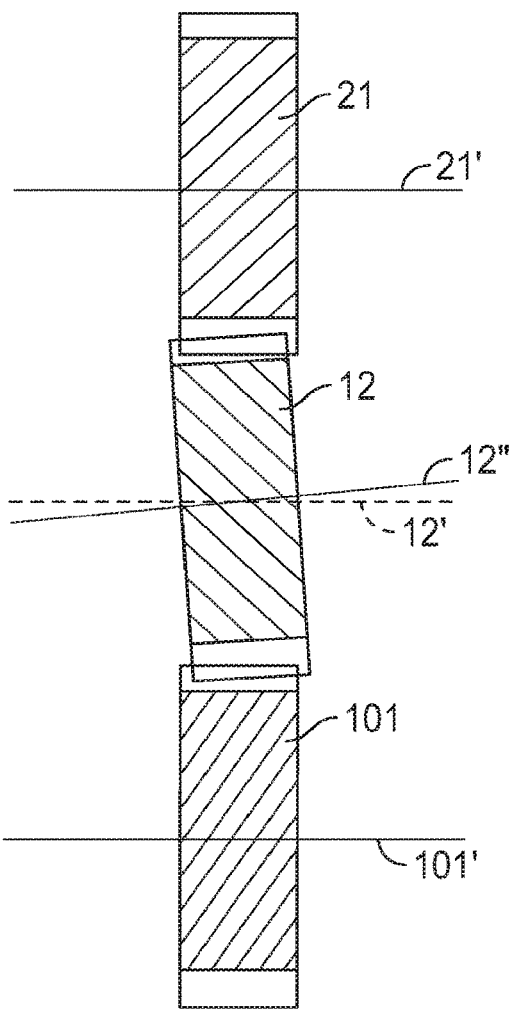 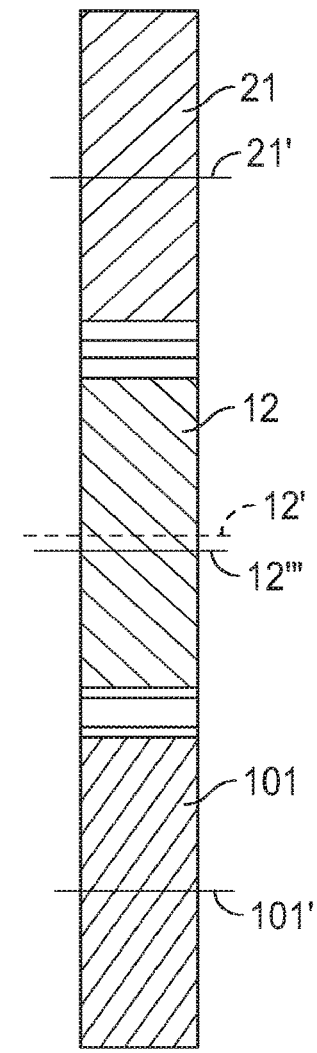
FIG. 2
(Prior Art)
FIG. 3
FIG. 4

VIBRATION ATTENUATION OF MATING GEARS IN A POWER TAKE-OFF

CROSS-REFERENCE TO RELATED APPLICATIONS

This application is a continuation patent application of U.S. patent application Ser. No. 16/644,008, filed Mar. 3, 2020. That application is the National Phase of International Application PCT/US2018/063187 filed Nov. 30, 2018, which designated the U.S. That International Application was published in English under PCT Article 21(2) on Jun. 6, 2019 as International Publication Number WO 2019/108868A1. PCT/US2018/063187 claims the benefit of United States Provisional Application No. 62/592,438, filed Nov. 30, 2017. The disclosures of all of these applications are incorporated herein by reference.

BACKGROUND OF THE INVENTION

This invention relates in general to power take-offs for transmitting rotational energy from a source of rotational energy to a rotatably driven accessory. In particular, this invention relates to an improved structure for such a power take-off that minimizes the transmission of torque transients and other vibrations therethrough from the source of rotational energy to the rotatably driven accessory, which results in a significant reduction in the amount of noise that may be generated during operation.

A power take-off is a well known mechanical device that is often used in conjunction with a source of rotational energy, such as a vehicle engine or transmission, to transfer rotational energy to a rotatably driven accessory, such as a hydraulic pump that is supported on the vehicle. For example, power take-offs are commonly used on industrial and agricultural vehicles to transfer rotational energy from the vehicle engine or transmission to one or more hydraulic pumps that, in turn, are used to operate hydraulically driven accessories provided on the vehicle, such as plows, trash compactors, lifting mechanisms, winches, and the like. The power take-off provides a simple, inexpensive, and convenient means for transferring energy from the source of rotational energy to the hydraulic pump that, in turn, transfers relatively high pressure fluid to operate the driven accessory.

A typical power take-off includes a housing, an input mechanism, and an output mechanism. The power take-off housing is adapted to be supported on a housing of the source of rotational energy. The power take-off housing includes an opening that can be aligned with a corresponding opening provided in the housing of the source of rotational energy. The input mechanism of the power take-off is supported within the power take-off housing and extends outwardly therefrom through the aligned openings and into the housing of the source of rotational energy. In this manner, the input mechanism of the power take-off is connected to the source of rotational energy so as to be rotatably driven whenever the source of rotational energy is operated. The output mechanism of the power take-off is also supported within the power take-off housing, is rotatably driven by the input mechanism, and is adapted to be connected to the rotatably driven accessory.

In some instances, the input mechanism of the power take-off is directly connected to the output mechanism such that the rotatably driven accessory is operated whenever the source of rotational energy is operated. In other instances, a clutch assembly is provided between the input mechanism and the output mechanism such that the rotatably driven accessory is operated only when the clutch assembly is engaged while the source of rotational energy is operated. In both instances, however, the power take-off includes one or more pairs of meshing gears as a part of either the input mechanism, the output mechanism, or a gear train mechanism connected between the input mechanism and the output mechanism.

It is well known that both internal combustion and diesel engines generate significant amounts of torsional vibrations during operation, primarily as a result of the non-linear nature of the combustion events occurring therein. These torsional vibrations are manifested as cyclical variations in the rotational speeds of the components of the source of rotational energy, which typically exhibit a sinusoidal pattern of alternating periods of acceleration and deceleration relative to an average rotational speed. Frequently, the input mechanism of the power take-off is rotatably driven by one of these components of the source of rotational energy. As a result, the torsional vibrations are transmitted from the source of rotational energy to the one or more pairs of meshing gears contained within the power take-off. In some instances, these torsional vibrations can result in the occurrence of a series of either single-sided or double-sided impacts between interfacing teeth of a pair of meshing gears, which usually generates an undesirable audible rattle or similar noise. This noise is often referred to as neutral rattle because it is most pronounced when clutch of the power take-off is disengaged or when the power take-off is otherwise not driving a heavy load, which would tend to dampen these torsional vibrations.

To prevent, or at least minimize, this undesirable neutral rattle noise from occurring, the pair of meshing gears would ideally be constructed having gear teeth that mesh perfectly, with no clearance between the adjacent gear teeth flanks and, thus, no opportunity to generate the noise. However, this ideal condition is not possible because of the reality of manufacturing tolerances, so pairs of meshing gears always have an inherent amount of tooth clearance that allows the respective gear teeth to mesh without undue wear. Nonetheless, it would still be desirable to provide an improved structure for a power take-off that dampens or otherwise attenuates these torsional vibrations and thereby reduces or eliminates the neutral rattle noise.

SUMMARY OF THE INVENTION

This invention relates to an improved structure for a power take-off that dampens or otherwise attenuates torsional vibrations and thereby reduces or eliminates neutral rattle noise. The power take-off includes a housing having a mounting surface that is adapted to be secured to a mounting surface provided on a source of rotational energy. The mounting surface of the housing of the power take-off has an opening therethrough. The power take-off also includes an input mechanism having an input gear that is rotatably supported on the housing of the power take-off. The input gear also has a portion that extends outwardly through the opening provided through the mounting surface of the housing of the power take-off and that is adapted to extend within and be rotatably driven by a driving gear contained within the source of rotational energy. The power take-off further includes an output mechanism that is disposed within the housing and includes a driven gear that is rotatably driven by the input gear of the input mechanism. A rotational axis of the input gear and a rotational axis of either the driving gear or the driven gear are misaligned so as to minimize the transmission of torque transients and other vibrations therethrough during operation.

Various aspects of this invention will become apparent to those skilled in the art from the following detailed description of the preferred embodiment, when read in light of the accompanying drawings.

BRIEF DESCRIPTION OF THE DRAWINGS

FIG. 2 is an enlarged schematic elevational view of a prior art gear train that includes a driving gear, a first driven gear, and a second driven gear.

FIG. 3 is an enlarged schematic elevational view of a first embodiment of a gear train in accordance with this invention that includes a driving gear, a first driven gear, and a second driven gear.

FIG. 4 is an enlarged schematic elevational view of a second embodiment of a gear train in accordance with this invention that includes a driving gear, a first driven gear, and a second driven gear.

DETAILED DESCRIPTION OF THE PREFERRED EMBODIMENT

Figure 1:
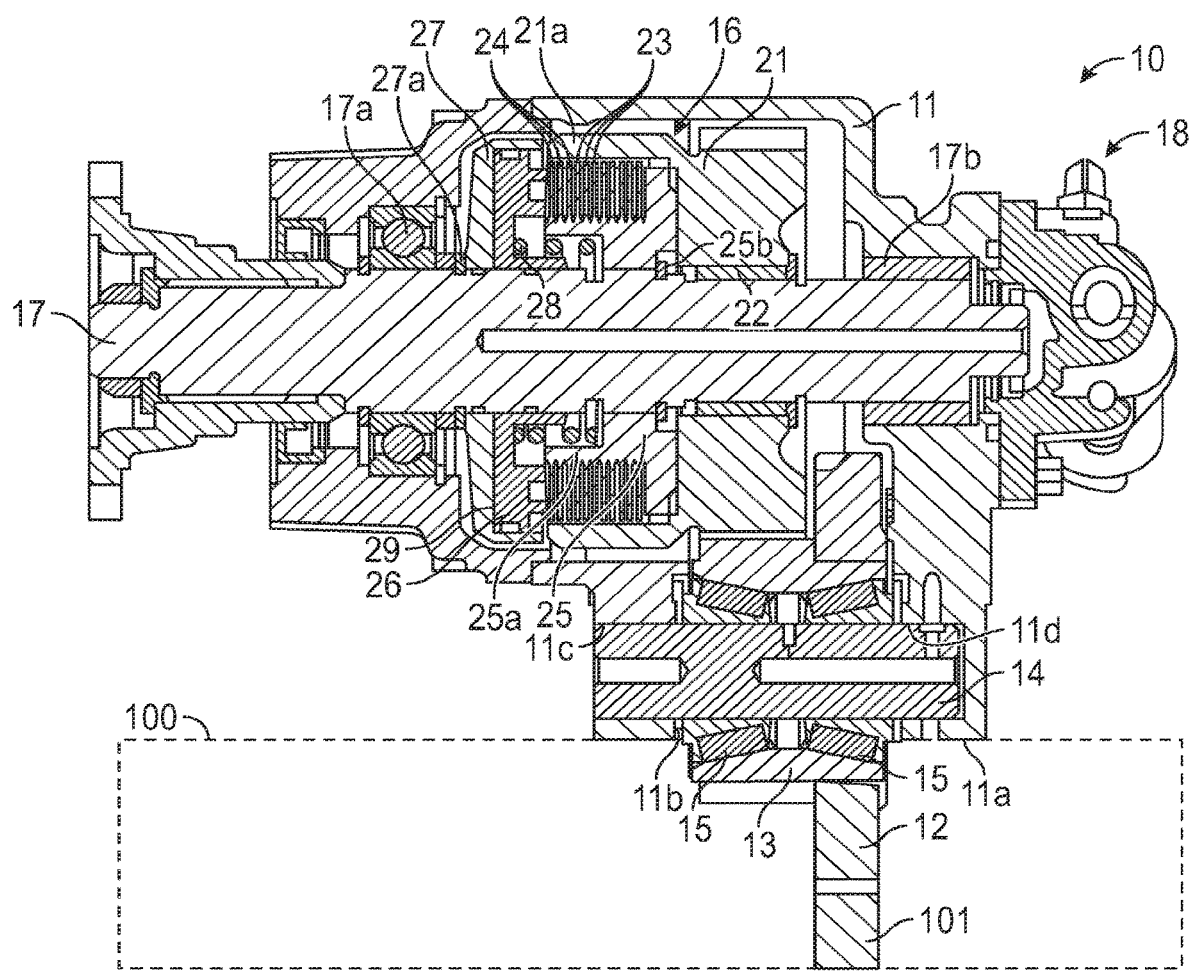
FIG. 1 is a sectional elevational view of a power take-off supported on a source of rotational energy in accordance with this invention.

Referring now to the drawings, there is illustrated in FIG. 1 a sectional elevational view of a power take-off, indicated generally at 10, in accordance with this invention. The basic structure and mode of operation of the power take-off 10 are well known in the art, and only those portions of the power take-off 10 that are necessary for a complete understanding of the invention will be described. Also, the illustrated power take-off 10 is intended merely to illustrate one environment in which this invention may be used. Thus, the scope of this invention is not intended to be limited for use with the specific structure for the power take-off 10 illustrated in FIG. 1 or with power take-offs in general. On the contrary, as will become apparent below, this invention may be used in any desired environment for the purposes described below.

The illustrated power take-off 10 includes a hollow housing 11 having a mounting surface 11a provided thereon. An opening 11b is provided through the mounting surface 11a of the power take-off housing 11. The power take-off 10 has an input mechanism that includes an input gear 12 that is rotatably supported within the power take-off housing 11. As shown in FIG. 1, a portion of the input gear 12 extends outwardly through the opening 11b provided through the mounting surface 11a.

The mounting surface 11a of the power take-off housing 11 is adapted to be secured (typically by a plurality of bolts—not shown) to a corresponding mounting surface provided on a housing of a source of rotational energy 100, such as an engine or a transmission of a vehicle. As is well known in the art, the portion of the input gear 12 that extends through the opening 11b of the power take-off housing 11 also extends through a corresponding opening (not shown) provided in the housing of the source of rotational energy 100 into engagement with a driving gear 101 or other mechanism provided therein. Thus, the input gear 12 of the power take-off 10 is rotatably driven whenever the driving gear 101 contained within the source of rotational energy 100 is rotatably driven.

The illustrated input gear 12 is splined onto or otherwise supported on an input gear hub 13 for concurrent rotation to form a conventional input cluster gear. However, it is known to form the input gear 12 and the input gear hub 13 integrally from a single piece of material. In either event, the input gear hub 13 is, in turn, rotatably supported on an input shaft 14 (shown in more detail in FIG. 8) by one or more bearings 15. First and second ends of the illustrated input shaft 14 are respectively (and typically non-rotatably) supported in first and second bores 11c and 11d provided in the power take-off housing 11. The manner in which the first and second ends of the input shaft 14 are supported in the first and second bores 11c and 11d will be described in detail below.

The power take-off 10 also includes a clutch assembly, indicated generally at 16, for selectively connecting the input gear hub 13 (and, thus, the input gear 12 supported thereon) to an output shaft 17. The output shaft 17 is, in turn, adapted to be connected to the rotatably driven accessory (not shown). The illustrated output shaft 17 is rotatably supported on the power take-off housing 11 by a pair of bearings 17a and 17b or other similar means. When the clutch assembly 16 is engaged, the input gear hub 13 is connected to the output shaft 17 for concurrent rotation. Thus, the rotatably driven accessory is rotatably driven by the source of rotational power when the clutch assembly 16 is engaged. Conversely, when the clutch assembly 16 is disengaged, the input gear hub 13 is disconnected from the output shaft 17. Thus, the rotatably driven accessory is not rotatably driven by the source of rotational power when the clutch assembly 16 is disengaged. A conventional shifter assembly, indicated generally at 18, may be provided to selectively engage and disengage the clutch assembly 16 in a known manner.

The clutch assembly 16 of the power take-off 10 includes a drive gear 21 that is rotatably driven by the input gear hub 13. The illustrated drive gear 21 includes an axially-extending hollow cylindrical bell portion 21a having a splined inner surface. The illustrated drive gear 21 is rotatably supported on the output shaft 17 by a bearing 22 and is formed integrally from a single piece of material with the hollow cylindrical bell portion 21a. However, it is known to form the drive gear 21 and the hollow cylindrical bell portion 21a from separate components that are splined or otherwise connected together for concurrent rotation. In either event, a plurality of flat annular clutch plates 23 is splined to the inner splined surface of the hollow cylindrical bell portion 21a of the drive gear 21 for rotation therewith. Thus, the drive gear 21 and the clutch plates 23 are constantly rotatably driven by the input gear 12.

A plurality of annular friction plates 24 is disposed in an alternating fashion between the clutch plates 23. The friction plates 24 are splined to an outer splined surface provided on an axially extending cylindrical portion 25a of a clutch gear 25 for rotation therewith. The clutch gear 25 is splined or otherwise secured to the output shaft 17 for rotation therewith. Thus, the friction plates 24, the clutch gear 25, and the output shaft 17 are connected for rotation together as a unit. The clutch gear 25 is restrained from axial movement in one direction (toward the right when viewing FIG. 1) by one or more retaining rings 25*b* that are mounted on the output shaft 17, for a purpose that will be explained below.

An annular clutch piston 26 is provided for selectively causing the clutch plates 23 and the friction plates 24 to frictionally engage one another so as to engage the clutch assembly 16. To accomplish this, the clutch piston 26 is disposed within a hollow cylindrical clutch cylinder 27. The clutch cylinder 27 has a closed end and an opened end. One end of the clutch piston 26 (the left end when viewing FIG. 1) is disposed within the clutch cylinder 27, while the opposite end of the clutch piston 26 (the right end when viewing FIG. 1) extends from the opened end of the clutch cylinder 27 adjacent to the clutch plates 23 and friction plates 24. Both the clutch piston 26 and the clutch cylinder 27 are supported on the output shaft 17 The clutch piston 26 is axially movable along the output shaft 17, but the clutch cylinder 27 is restrained from axial movement in one direction (toward the left when viewing FIG. 1) by one or more retaining rings 27*a* that are mounted on the output shaft 17 for a purpose that will be explained below.

A coiled clutch spring 28 reacts between the clutch piston 26 and the clutch gear 25. As discussed above, the clutch gear 25 is restrained from axial movement in one direction (toward the right when viewing FIG. 1) by the retaining ring 25*b*. Thus, the clutch spring 28 urges the clutch piston 26 axially in the opposite direction (toward the left when viewing FIG. 1) toward a disengaged position adjacent to the closed end of the clutch cylinder 27. In the disengaged position, the clutch piston 26 does not engage the clutch plates 23 or the friction plates 24. Thus, the clutch plates 23 and the friction plates 24 do not frictionally engage one another. As a result, the clutch gear 25 is disconnected from the drive gear 21 so as to provide no rotatable driving connection therebetween.

To engage the clutch assembly 16, the shifter assembly 18 is actuated to supply pressurized fluid to an annular clutch chamber 29 defined between the clutch piston 26 and the closed end of the clutch cylinder 27. As a result, the clutch piston 26 is moved axially in the one direction (toward the right when viewing FIG. 1) toward an engaged position. In the engaged position, the clutch piston 26 causes the clutch plates 23 and the friction plates 24 to frictionally engage one another. As a result, the clutch gear 25 is connected to the drive gear 21 so as to provide a rotatable driving connection therebetween.

FIG. 2 is an enlarged schematic elevational view of a prior art gear train that includes a driving gear (which may, for example, be the driving gear 101 contained within the source of rotational energy 100 illustrated in FIG. 1), a first driven gear (which may, for example, be the input gear 12 provided within the power take-off 10 illustrated in FIG. 1), and a second driven gear (which may, for example, be the drive gear 21 provided within the power take-off 10 illustrated in FIG. 1). The driving gear 101 contained within the source of rotational energy 100 is supported for rotation about an axis 101', the input gear 12 is supported (on the input shaft 14) for rotation about an axis 12', and the drive gear 21 is supported for rotation about an axis 21'. As shown in FIG. 2, the three rotational axes 101', 12', and 21' are all parallel to one another, and the axis 12' is disposed equidistantly between the axis 101' and the axis 21'. In this prior art gear train, the pairs of meshing gears have an inherent amount of tooth clearance to allow the respective gear teeth to mesh without undue wear. Unfortunately, as described above, the presence of this tooth clearance facilitates the generation of undesirable neutral rattle noise during use.

FIG. 3 is an enlarged schematic elevational view of a first embodiment of a gear train in accordance with this invention that includes a driving gear (which may, for example, be the driving gear 101 contained within the source of rotational energy 100 illustrated in FIG. 1), a first driven gear (which may, for example, be the input gear 12 provided within the power take-off 10 illustrated in FIG. 1), and a second driven gear (which may, for example, be the drive gear 21 provided within the power take-off 10 illustrated in FIG. 1). The driving gear 101 contained within the source of rotational energy 100 is supported for rotation about the axis 101', the input gear 12 is supported (on the input shaft 14) for rotation about an axis 12", and the drive gear 21 is supported for rotation about the axis 21'. However, in this first embodiment of the gear train of this invention, the three rotational axes 101', 12", and 21' are not all parallel to one another. Rather, as shown in FIG. 3, the axis 12" defined by the input gear 12 extends at a non-parallel angle relative to the axis 101' defined by the gear 101 contained within the source of rotational energy 100. This non-parallel orientation of the axis 12" is best illustrated by reference to the dotted line 12' in FIG. 3, which corresponds with the prior art parallel orientation of the axis 12' shown in FIG. 2. Similarly, the axis 12" defined by the input gear 12 also extends at a non-parallel angle relative to the axis 21' defined by the drive gear 21 provided within the power take-off 10.

The non-parallel orientation of the axis 12" defined by the input gear 12 and the axis 101' defined by the gear 101 contained within the source of rotational energy 100 (and/or the axis 21' defined by the drive gear 21 provided within the power take-off 10) results in an intentional axial misalignment of the mating teeth of such gears 12 and 101 (and/or 21). This axial misalignment causes contact between the mating teeth of such gears 12 and 101 (and/or 21) that effectively eliminates backlash and neutral gear rattle, especially when the power take-off 10 is idling (e.g., when the source of rotational energy 100 is rotating the gears 12 and 101 (and/or 21), but the clutch 16 is disengaged such that little or no torque is transmitted through the power take 10 to the rotatably driven device). The manner in which the input gear 12 may be supported in the illustrated non-parallel orientation relative to the gears 101 and/or 21 will be described below.

FIG. 4 is an enlarged schematic elevational view of a second embodiment of a gear train in accordance with this invention that includes a driving gear (which may, for example, be the gear 101 contained within the source of rotational energy 100 illustrated in FIG. 1), a first driven gear (which may, for example, be the input gear 12 provided within the power take-off 10 illustrated in FIG. 1), and a second driven gear (which may, for example, be the drive gear 21 provided within the power take-off 10 illustrated in FIG. 1). The gear 101 contained within the source of rotational energy 100 is supported for rotation about the axis 101', the input gear 12 is supported (on the input shaft 14) for rotation about an axis 12''', and the drive gear 21 is supported for rotation about the axis 21'. However, in this second embodiment of the gear train of this invention, the axis 12''' is not disposed equidistantly between the axis 101' and the axis 21'. Rather, as shown in FIG. 4, the axis 12''' defined by the input gear 12 is axially offset farther away from the axis 21' defined by the drive gear 21 and closer toward the axis 101' defined by the gear 101 contained within the source of rotational energy 100. This offset orientation of the axis 12" is best illustrated by reference to the dotted line 12' in FIG. 4, which corresponds with the prior art equidistant orientation of the axis 12' shown in FIG.

2. Alternatively, the axis 12''' defined by the input gear 12 could be axially offset closer toward the axis 21' defined by the drive gear 21 and farther away from the axis 101' defined by the gear 101 contained within the source of rotational energy 100 if desired.

In either case, the non-equidistant orientation of the axis 12''' defined by the input gear 12 and the axis 101' defined by the gear 101 contained within the source of rotational energy 100 (or the drive gear 21 provided within the power take-off 10) results in an intentional axial misalignment of the mating teeth of such gears 12 and 101 (or 21). This axial misalignment causes contact between the mating teeth of such gears 12 and 101 (or 21) that effectively eliminates backlash and neutral gear rattle, especially when the power take-off 10 is idling (e.g., when the source of rotational energy 100 is rotating the gears 12 and 101, but the clutch 16 is disengaged such that little or no torque is transmitted through the power take 10 to the driven device). The manner in which the input gear 12 may be supported in the illustrated non-equidistant orientation will be described below.

As described above, the terms "not disposed equidistantly" and "non-equidistant" refer to a situation wherein the axis 12' is located at a position that is something other than halfway between the axis 101' and the axis 21', as distinguished from the orientation of the prior art axis 12' shown in FIG. 2. However, these terms need not be interpreted with reference to both of the axes 101' and 21'. Rather, such terms may refer to a situation where the axis 12''' is located at a position relative to either the axis 101' or the axis 21', wherein the respective teeth of the gears supported on those shafts interact in the same manner to effectively eliminate backlash and neutral gear rattle, especially when the power take-off 10 is idling as described above.

The embodiments of this invention shown in FIG. 3 and FIG. 4 may be implemented individually, but are not necessarily mutually exclusive. On the contrary, the axis defined by input gear 12 may, for example, both (1) extend at a non-parallel angle relative to the axis 101' defined by the gear 101 contained within the source of rotational energy 100 (as shown in FIG. 3) and simultaneously (2) be axially offset away from the axis 21' defined by the drive gear 21 and toward the axis 101' defined by the gear 101 contained within the source of rotational energy 100 (as shown in FIG. 4).

Figure 5:
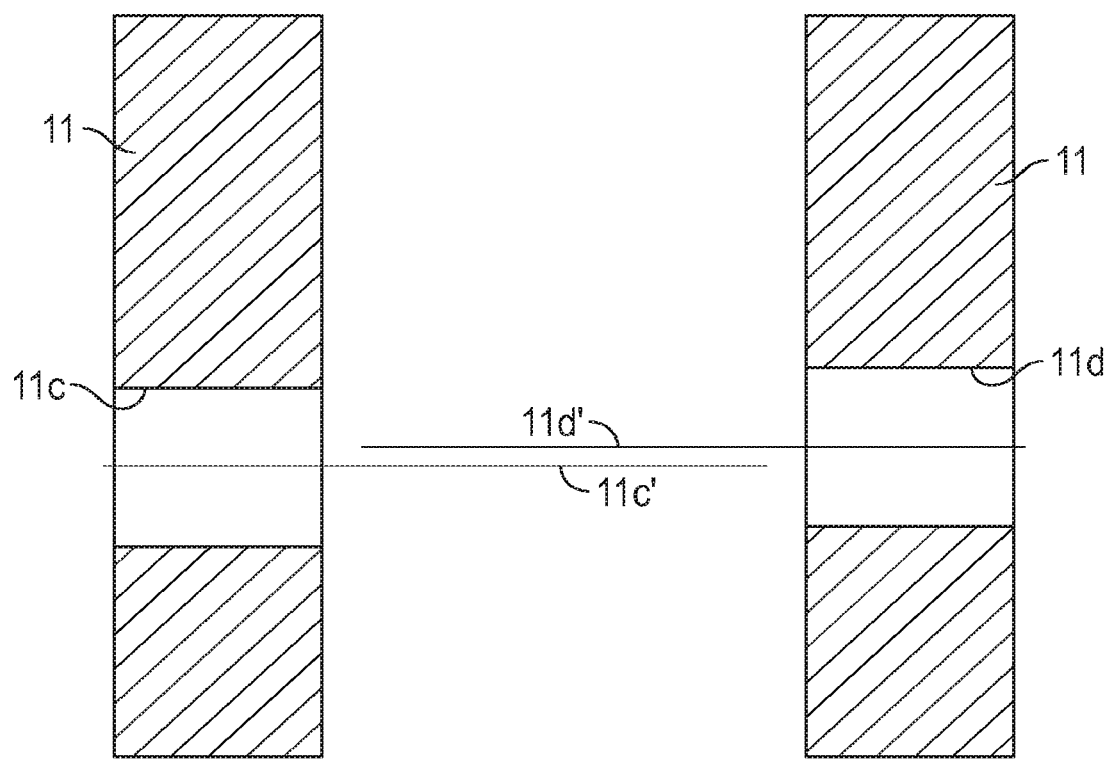
FIG. 5 is an enlarged schematic sectional view of a portion of a first embodiment of the power take-off housing illustrated in FIG. 1.

FIG. 5 is an enlarged schematic sectional view of a portion of a first embodiment of the housing 11 for the power take-off 10 illustrated in FIG. 1. As discussed above, the first and second ends of the input shaft 14 are respectively supported in the first and second bores 11c and 11d provided in the power take-off housing 11. The first bore 11c defines a first axis 11c', while the second bore 11d defines a second axis 11d'. Unlike the bores provided in the housing of a prior art power take-off (wherein the first axis 11c' and the second axis 11d' are co-axially aligned), the first axis 11c' and the second axis 11d' illustrated in FIG. 5 are offset from one another. The offset orientation of the first and second bores 11c and 11d can be used to support the input shaft 14 in the non-parallel orientation illustrated in FIG. 3. Alternatively, the first and second bores 11c and 11d provided in the power take-off housing 11 may be oriented such that the first axis 11c' and the second axis 11d' are co-axially aligned with one another, but are not disposed equidistantly between the axis 101' and the axis 21', as shown in FIG. 4.

Figure 6:
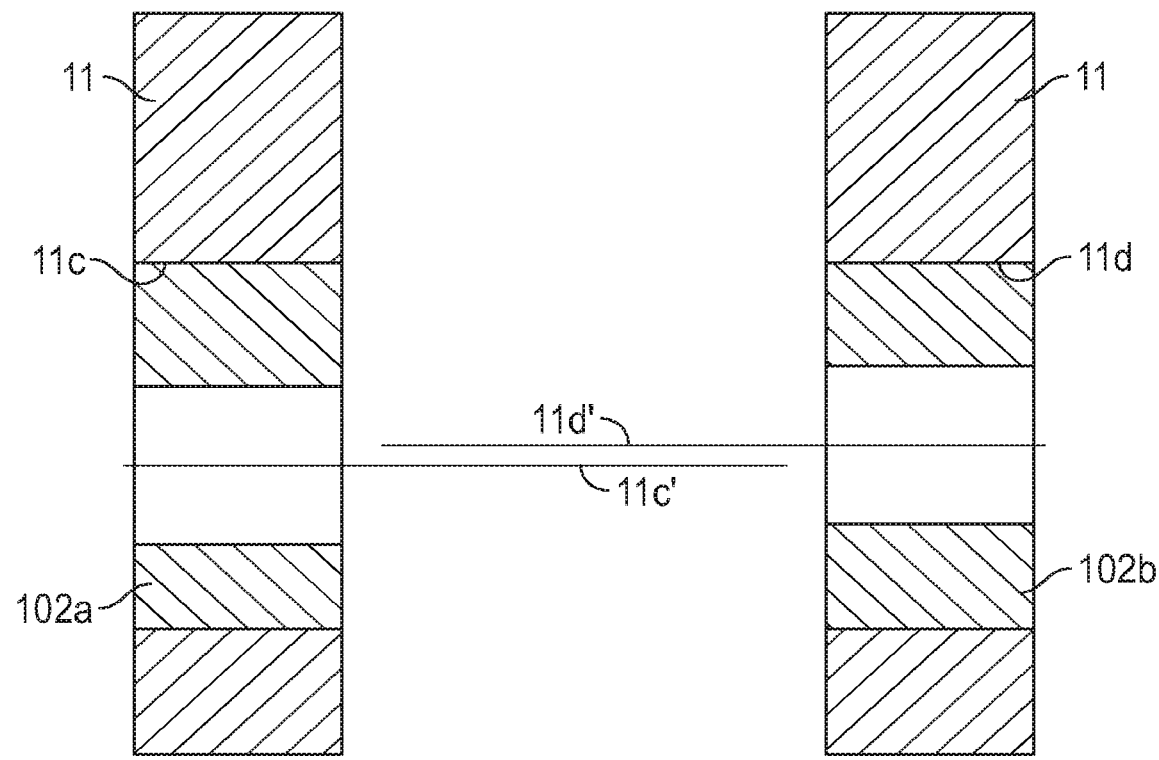
FIG. 6 is an enlarged schematic sectional view of a portion of a second embodiment of the power take-off housing illustrated in FIG. 1.

FIG. 6 is an enlarged schematic sectional view of a portion of a second embodiment of the housing 11 of the power take-off 10 illustrated in FIG. 1. The second embodiment of the housing 11 is, in large measure, identical to the first embodiment of the housing 11 illustrated in FIG. 5. However, instead of the first and second ends of the input shaft 14 being respectively supported directly in the first and second bores 11c and 11d provided in the power take-off housing 11 as shown in FIG. 5, the first and second ends of the input shaft 14 are supported in respective journals 102a and 102b that, in turn, are respectively supported in such first and second bores 11c and 11d. The journals 102a and 102b respectively define the first axis 11c' and the second axis 11d', which may be either axially offset from one another (as shown in FIG. 3) or co-axially aligned, but not disposed equidistantly between the axis 101' and the axis 21' (as shown in FIG. 4). The journals 102a and 102b may be formed from a rigid material, similar to the housing 11 of power take-off 10. Alternatively, the journals 102a and 102b may be formed from a semi-rigid material that permits some relative movement between them and the associated ends of input shaft 14 (such as described below). Additionally, if desired, one of the first and second ends of the input shaft 14 may be supported directly in one of the first and second bores 11c and 11d provided in the power take-off housing 11, while the other of the first and second ends of the input shaft 14 may be supported in the other one of the journals 102a and 102b.

Figure 7:
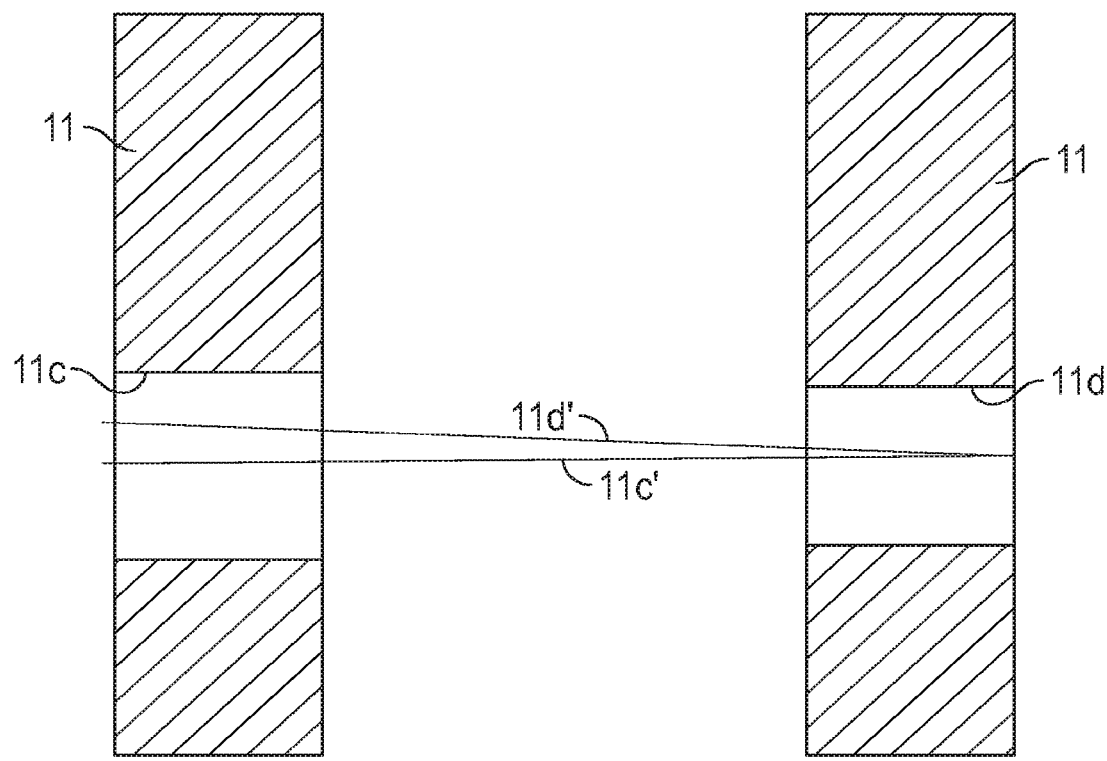
FIG. 7 is an enlarged schematic sectional view of a portion of a third embodiment of the power take-off housing illustrated in FIG. 1.

FIG. 7 is an enlarged schematic sectional view of a portion of a third embodiment of the housing 11 for the power take-off 10 illustrated in FIG. 1. The third embodiment of the housing 11 is, in large measure, identical to the first embodiment of the housing 11 illustrated in FIG. 5. However, in this third embodiment, the sizes of the first and second bores 11c and 11d are different from one another. In the illustrated embodiment, the size of the first bore 11c is larger than the size of the second bore 11d. Thus, the end of the input shaft 14 that is supported in the second bore 11d is fixed in position relative to the housing 11 of the power take-off 10, while the other end of the input shaft 14 that is supported in the first bore 11c is movable relative to such housing 11. As a result, the input shaft 14 can pivot relative to the housing 11, as shown by the illustrated axes 11c' and 11d' in FIG. 7. Such pivoting movement can be used to support the input shaft 14 in the non-parallel orientation illustrated in FIG. 3.

Figure 8:
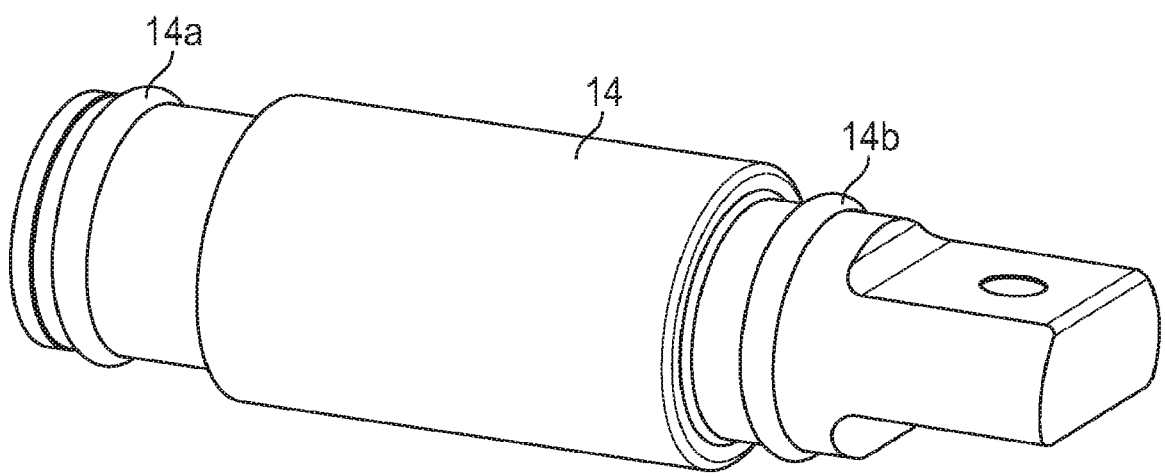
FIG. 8 is an enlarged perspective view of an embodiment of an input shaft of the power take-off illustrated in FIG. 1.

FIG. 8 is an enlarged perspective view of the input shaft 14 that can be provided for supporting the input gear 12 within the power take-off 10 illustrated in FIG. 1. As shown therein, the input shaft 14 is provided with two longitudinally opposed resilient support structures that serve to support the ends of the input shaft 14 in the first and second bores 11c and 11d provided in the power take-off housing 11. In the illustrated embodiment, the resilient support structures are embodied as a pair of elastomeric O-rings 14a and 14b. However, the resilient support structures may be embodied as any other structure or combination of structures that can allow a limited amount of movement to occur between the ends of the input shaft 14 and the housing 11. For example, the resilient support structures may be embodied as springs or spring-loaded poppets, such as shown in U.S. Pat. No. 9,494,227 and U.S. Patent Publication No. 2015/0276040, the disclosures of which are incorporated herein by reference.

When little or no load is being transmitted through the power take-off 10, the input gear 12 is supported in either the non-parallel orientation relative to the gear 101 contained within the source of rotational energy 100 (as shown in FIG. 3) or in the non-equidistant orientation between the axis 101' and the axis 21' (as shown in FIG. 4) by virtue of the orientation of the first and second bores 11c and 11d provided in the power take-off housing 11 and the elastomeric O-rings 14a and 14b provided on the ends of the input shaft 14. However, when a larger load is transmitted through the power take-off 10, one or both of the elastomeric O-rings 14a and 14b is compressed, causing the input shaft 14 to seat itself tangent to the first and second bores 11c and 11d, with its axis in the plane of the resultant force vector. Thus, the input gear 12 is moved to the parallel and equidistant orientation (as shown in FIG. 2) for normal use of the power take-off 10. When the load transmitted through the power take-off 10 is subsequently reduced, there will be no appreciable force acting on either the input shaft 14 or the input gear 12 in the direction of the resultant force vector. Therefore, the biasing forces from the elastomeric O-rings 14a and 14b supporting the ends of the input shaft 14 in the first and second bores 11c and 11d of the housing 11 will prevail to center the each end of the input shaft 14 therein. Thus, the input gear 12 will return to its original orientation, either the non-parallel orientation relative to the gear 101 contained within the source of rotational energy 100 (as shown in FIG. 3) or the non-equidistant orientation between the axis 101' and the axis 21' (as shown in FIG. 4).

Because of this manufactured axial misalignment of the first and second bores 11c and 11d provided in the power take-off housing 11, the unloaded orientation of the input gear 12 effectively causes the rotational axis of the gear shaft 14 to skew itself relative to the fixed shaft axes of the gears 101 and gear 21. While relatively small in magnitude, this skewing of the input shaft 14 causes the meshing teeth of the gears 101, 12, and 21 to become slightly misaligned. In effect, this misalignment simulates a larger-than-actual tooth thickness in the teeth of the first driven gear 12, which then mesh as if the amount of backlash was significantly reduced. This reduces or eliminates the rattling of the meshing teeth (between the gears 101 and 12 and between the gears 12 and 21 to against one another.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A power take-off that is adapted to be secured to a source of rotational energy, the power take-off comprising:
   a housing including a mounting surface that is adapted to be secured to the source of rotational energy, the mounting surface having an opening therethrough;
   an input mechanism including an input gear that has a portion that extends outwardly from the housing through the opening provided through the mounting surface and is adapted to extend within and be rotatably driven about an input gear rotational axis by a driving gear contained within the source of rotational energy; and
   an output mechanism disposed within the housing and including a driven gear that is rotatably driven about an output gear rotational axis by the input gear of the input mechanism,
   wherein the rotational axis of the input gear and the rotational axis of the driven gear are movable to a non-parallel orientation relative to one another so as to minimize the transmission of torque transients and other vibrations therethrough during operation.

2. An assembly of a power take-off and a source of rotational energy, the assembly comprising:
   the source of rotational energy including a mounting surface having an opening and a driving gear that rotates about a driving gear axis; and
   the power take-off including (1) a housing including a mounting surface that is secured to the mounting surface of the source of rotational energy, the mounting surface of the housing of the power take-off having an opening therethrough that is aligned with the opening through the mounting surface of the source of rotational energy; (2) an input mechanism including an input gear that has a portion that extends through the aligned openings into engagement with the driving gear so as to be rotatably driven about an input gear rotational axis; and (3) an output mechanism disposed within the housing and including a driven gear that is rotatably driven by the input gear of the input mechanism
   wherein the rotational axis of the input gear and the rotational axis of the driving gear are movable to a non-parallel orientation relative to one another so as to minimize the transmission of torque transients and other vibrations therethrough during operation.

3. The assembly defined in claim 2 wherein the rotational axis of the input gear and the rotational axis of the driven gear are also movable to a non-parallel orientation relative to one another so as to minimize the transmission of torque transients and other vibrations therethrough during operation.

* * * * *